N. CHAPPELL.
Bean Harvester.
No. 46,216.
Patented Feb. 7, 1865.
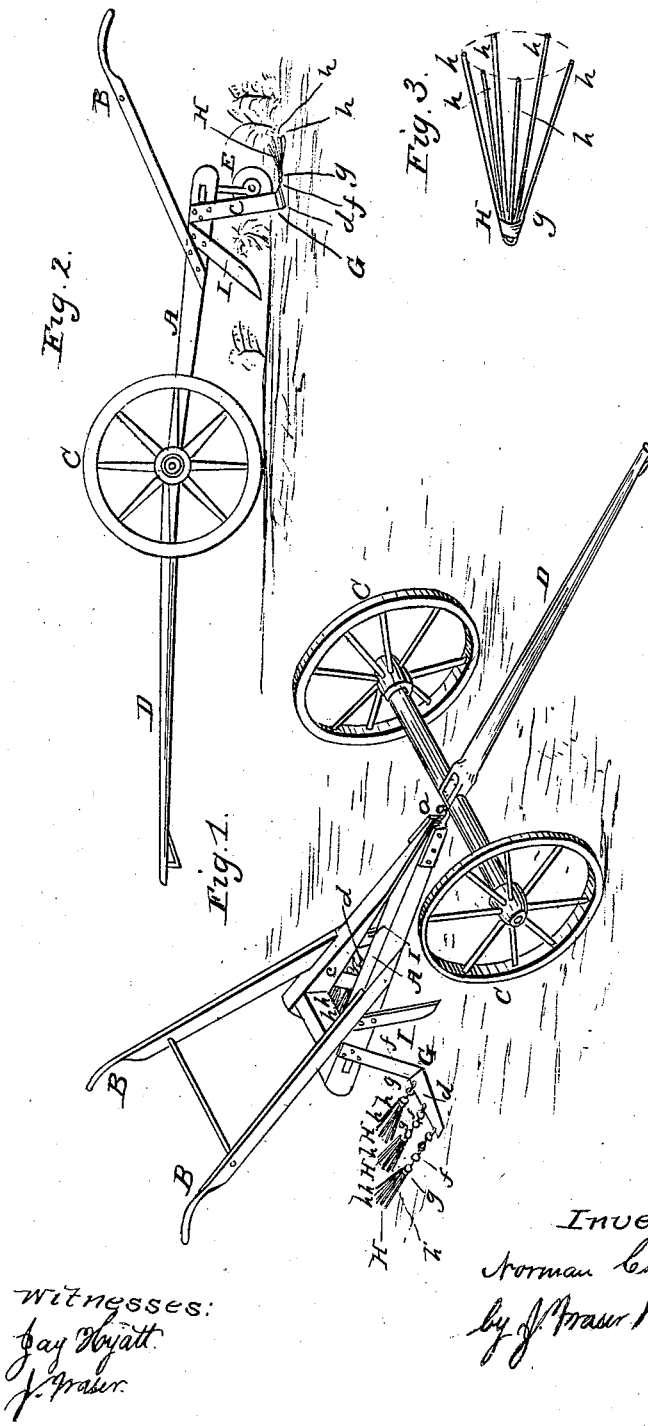

UNITED STATES PATENT OFFICE.

NORMAN CHAPPELL, OF EAST AVON, NEW YORK.

IMPROVEMENT IN BEAN-HARVESTERS.

Specification forming part of Letters Patent No. 46,216, dated February 7, 1865.

*To all whom it may concern:*

Be it known that I, NORMAN CHAPPELL, of East Avon, in the county of Livingston and State of New York, have invented a new and useful Improvement in Machines for Harvesting Beans; and I do hereby declare that the following is a full and exact description thereof, reference being had to the accompanying drawings, making part of this specification.

Figure 1 is a perspective view of my improved machine; Fig. 2, a side elevation thereof in the act of harvesting; Fig. 3, a perspective view of one of the "clearers."

Like letters of reference indicate corresponding parts in all the figures.

My invention consists in a set of clearers or skeleton drags attached to and following after the cutter that run under the rows of beans, and in the use of certain colters, the whole so arranged that the beans are thrown up by the roots and perfectly cleared of the earth without shattering or wasting them. Several devices for this purpose have already been in use. In most of these the design has been to cut the stalks of the beans above the ground. This is difficult, not only on account of the tangled condition of the stalks and tops, but also especially on account of the hard woody nature of the stalks. I perform the operation by means of suitable cutters that run under the rows at a suitable depth—say three or four inches—thus throwing them up, roots and all, with the best action.

As represented in the drawings, a suitable frame, A, similar to a cultivator-frame, is provided, having handles B to guide the machine. This frame is connected with the axle of a pair of wheels, C C, with which a pair of horses or a single horse may be connected by means of a suitable pole or thills, D.

The connection of the frame A with the axle may be accomplished by a hook-and-eye joint, *a*, as this not only allows the frame to be easily and readily attached and detached, but also furnishes a universal joint by which the said frame may be either raised or lowered or moved laterally or turned in an angular position at pleasure.

At the rear of the frame is a gage-wheel, E, adjustable up and down, by which means the device is made to cut deeper or shallower, as may be necessary.

At a suitable position on opposite sides of the frame are secured cutters G G, the same consisting, respectively, of a shank, *c*, and a right-angled or horizontal knife, *d*, of suitable length to cut under the row and separate the stalks as it is drawn along. To the rear side of this knife *d* are attached by means of links *f f,* or in some equivalent manner, skeleton drags or clearers H H, the same being preferably of conical form, and consisting of a head, *g,* to which the links are joined, and radiating arms or rods *h h*, of suitable length, forming a circle in outline at the rear, as represented most clearly in Fig. 3.

I prefer to gradually increase the length of the links or connections *f f* of the clearers from the inner to the outer one, as shown in Fig. 1.

In front of the cutters G G are respectively situated colters I I, as represented.

The operation of the machine is as follows: As it is drawn along, the colters I I pass between the rows, and thus separate the tops of one row from those of the next, in order that the beans may pass backward over the cutters freely. The knives *d* cut into the soil under the roots, and the beans, passing over backward, come in contact with the clearers H, which, by their peculiar form, not only raise the roots above the surface of the ground, but also, by the agitation and action that is given them, free them as entirely of dirt as if they were pulled and shaken by the hand.

Clearers forming merely a flat surface or solid would not act in the same manner as those described above, for, as the roots are raised thereby, it is necessary that there be an open space beneath them to allow the dirt to escape that is separated from the roots by the agitation. This is produced by the circular form, which raises the roots so far above the surface of the earth as they pass over them that the dirt can sift down through.

It is apparent that a single instead of a double cutter, G, may be employed, if desired.

What I claim as my invention, and desire to secure by Letters Patent, is—

1. The clearer or clearers H, in combination with the cutter or cutters G and a suitable frame, A, arranged and operating substantially as herein set forth.

2. In combination with the clearers H, cutters G, and frame A, the colters I, arranged and operating substantially as herein specified.

In witness whereof I have hereunto signed my name in the presence of two subscribing witnesses.

NORMAN CHAPPELL.

Witnesses:
JAY HYATT,
J. FRASER.